United States Patent [19]
Hata

[11] 3,872,268
[45] Mar. 18, 1975

[54] TIRE PRESSURE DETECTING SWITCH
[75] Inventor: Shigeki Hata, Saitama-ken, Japan
[73] Assignee: Kanto Seiki Company Limited, Omiya-shi, Saitama-ken, Japan
[22] Filed: Jan. 4, 1974
[21] Appl. No.: 430,697

[30] Foreign Application Priority Data
  Jan. 20, 1973  Japan............................ 48-6151[U]

[52] U.S. Cl.......... 200/61.22, 116/34 R, 200/61.25, 200/82 E, 200/83 J, 200/83 L, 340/58
[51] Int. Cl. ........................................... H01h 35/24
[58] Field of Search........... 200/61.25, 61.22–61.26, 200/82 R, 82 D, 82 E, 83 J, 83 L; 340/58; 116/34 R; 73/146.5

[56] References Cited
UNITED STATES PATENTS

| | | | |
|---|---|---|---|
| 3,610,852 | 10/1971 | Lejeune............................ | 200/61.25 |
| 3,638,180 | 1/1972 | Lejeune............................ | 340/58 |
| 3,654,601 | 4/1972 | Munson....................... | 200/61.25 X |
| 3,715,719 | 2/1973 | Sugiyama............................ | 340/58 |
| 3,760,350 | 9/1973 | Johnson...................... | 200/61.25 X |
| 3,781,787 | 12/1973 | Sugiyama................... | 200/61.25 X |
| 3,832,681 | 8/1974 | Kaida et al........................... | 340/58 |

*Primary Examiner*—James R. Scott
*Attorney, Agent, or Firm*—McGlew and Tuttle

[57] ABSTRACT

A device for detecting a tire pressure drop below a controlled value during drive of a vehicle comprises a magnetic member fixed to and rotating with the wheel rim and a switch element fixed to the wheel axle and responsive to an operative orientation of the magnetic field produced by the magnetic member which is carried by a pivotal shaft. A plunger responsive to the tire pressure drop locks the shaft and thereby the magnetic member in an inoperative position as long as the tire pressure is sufficiently high but releases the shaft as soon as the tire pressure drops, whereupon a spring turns the shaft with the magnetic member into the operative position in which the fixed switch element is actuated by the magnetic field at each turn of the wheel. The plunger is mounted in a guide sleeve extending tangentially to the wheel rim and the considerable frictional resistance due to centrifugal forces and impeding a correct operation of the plunger and of its biasing spring is eliminated by providing a low friction guiding surface.

7 Claims, 8 Drawing Figures

PATENTED MAR 18 1975　　3,872,268

TIRE PRESSURE DETECTING SWITCH

FIELD AND BACKGROUND OF THE INVENTION

The present invention relates to the smoothing and stabilizing of the function of a tire pressure detecting device mounted on a wheel of a vehicle and having a moving member respondent to the pressure.

DESCRIPTION OF THE PRIOR ART

An example of a conventional device is here explained in connection with FIG. 1 and FIG. 2, wherein a tubeless tire (1) of a vehicle is mounted on a wheel rim (2) and a wheel disk (3) is bolted onto a brake drum (4). The device (5) for detecting tire pressure mounted on a wheel rim (2) as shown in FIG. 2. At a location facing the device (5), e.g. on the back plate (6) of brake drum, a magnetically actuable switch (8) is fixed to a bracket (7).

Inside the housing (9) of said device for detecting tire pressure is inserted a revolving shaft (12) which is biased by a spring (10) in the direction of revolution and on the end of which a magnet is fixed. The connecting part (12a) provided on the peripheral surface of said revolving shaft is engaged with an end of a plunger (15), which is normally forced in the rightward direction by a spring (14) and which is in contact with a diaphragm (13).

Hereinafter the operation of said device will be explained. When the tire pressure is at or over the prescribed value, the engagement between an end of the plunger (15) and the revolving shaft (12) is maintained by the pressure imposed upon the diaphragm (13) and the magnet (11) is situated at right angle to the magnetically actuable switch (8) so that the latter is not actuated. When the tire pressure drops below the prescribed value, the plunger (15) travels to the right under the force of the spring (14), thus releasing the engagement with the revolving shaft (12). The revolving shaft (12) and the magnet (11) are rotated under the force of the spring (10) and become parallel to the magnetically actuable switch (8) as shown with the double-dot-and-dash line, imposing magnetic flux (16) onto the magnetically actuable switch (8) so that the latter actuates the alarm in the driver's cabin by a repeated response motion in accordance with the revolution of the tire.

However said device, when mounted on a vehicle and put to a test drive, showed a defect that this device does not respond to a possible decrease in the tire pressure, when the vehicle equipped with 14 inch wheels is running at a speed of 120 km/h or more.

This phenomena are examined in the following from every possible aspect. By the centrifugal force due to the revolution of the wheel, sliding part (15a) of said plunger (15) is pushed above, as shown in FIG. 2, and the spring (14) also is bent, as shown with the double-dot-and-dash line (14') in FIG. 2, and comes in contact with the inner surface of the housing (9). Thus, even when the tire pressure decreases during high speed drive, the frictional force of the plunger (15) is much increased due to said centrifugal accelelation so that the movement of the plunger (15) to the right requires much force and only when the decrease in tire pressure exceeds by far the prescribed value, the engagement between the plunger (15) and the revolving shaft (12) will be released. This results in an objectionable fact that the alarming level of tire pressure decreases inversely proportionally to the n-th power of driving speed of the vehicle.

Also in an extreme case the device can become totally inoperable due to the friction by the centrifugal acceleration of plunger (15). In such a case the function of the device for tire pressure alarm is lost.

Aside from the drawbacks just mentioned, it is troublesome that many working operations are necessary if an inner surface of a housing having a sufficiently low coefficient of friction is to be obtained by machining. Similar difficulties arise in the maintaining of the initially low coefficient of friction of such machined inner surfaces because due to the fact that the plunger is in action only sporadically when the tire pressure drops and thus the frequency of its motion is very low, the surfaces rust or oxidize in the course of long service to an extent depending on the quality of the used material.

SUMMARY OF THE INVENTION

In accordance with the present invention, there is provided an improved construstion avoiding the mentioned drawbacks and insuring a full operational capacity of the pressure detecting device during the entire service life.

The object of the invention is to maintain a very low frictional resistance of the surface along which the plunger responsive to the tire pressure is guided, during a long period of time by providing that the respective surface is made of a material having a low coefficient of friction.

The characteristics of such a surface cannot be obtained by any conventional machining operation and they insure a faultless action even if after a long resting period, the device has to respond suddenly, and enhance the reliability of the warning system.

For a better understanding of the invention, its operating advantages and specific objects attained by its use, reference should be had to the accompanying drawings and descriptive matter in which there is illustrated and described a preferred embodiment of the invention.

GENERAL DESCRIPTION OF PREFERRED EMBODIMENTS

Figure 1:
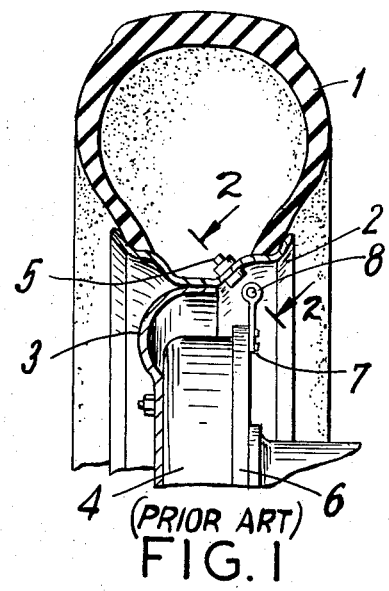
FIG. 1 is a partial sectional view showing the mounting of a device for detecting tire pressure, according to the prior art.
Figure 2:
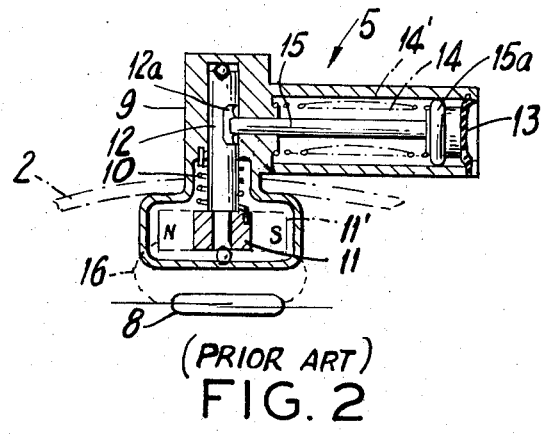
FIG. 2 is an enlarged sectional view taken along the line 2—2 of FIG. 1.
Figure 3:
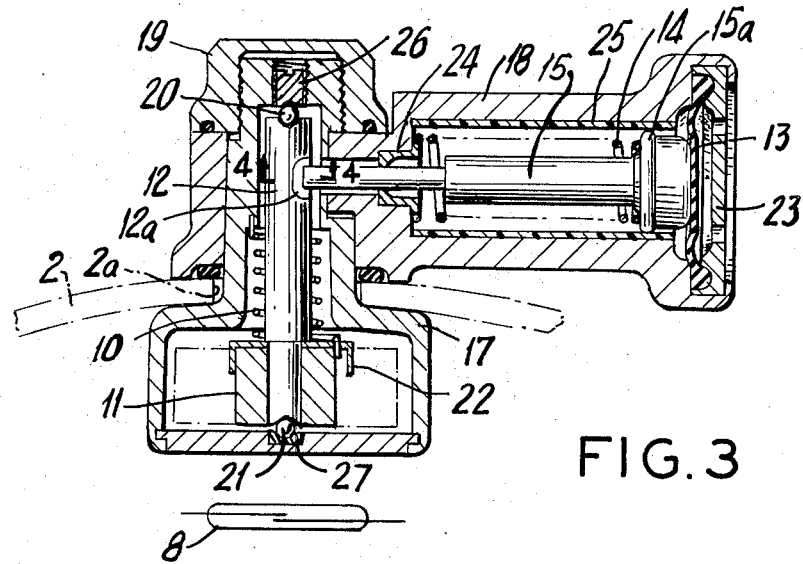
FIG. 3 is an enlarged sectional view similar to FIG. 2 showing the detecting device in an arrangement in accordance with the invention.

Referring to FIG. 3, in particular, a wheel rim 2 is provided with a through hole 2a and a first housing 17 is extending therethrough with a second housing 18 screwed tightly to the first housing by means of a cap nut 19.

Inside the first housing (17) is arranged a revolving shaft (12) with upper and lower ends supported rotatable by means of balls (20) and (21), and a magnet is mounted on the lower end of the revolving shaft. Further the ball (20) rests against an adjusting hard bolt (26) and the ball (21) also rests against a hard seat (27) and after having adjusted the end play by means of the bolt (26), the balls are sealed with an adhesive such as epoxy resin. A spring (10) is engaged with the first housing (17) with one end and engaged with a plate (22) mounted onto the magnet (11) with the other end, thus forcing the revolving shaft (12) in the revolving direction.

The secone housing (18) is substantially cylindrical and with one end capable of fitting into the said first housing (17) and onto its other end a diaphragm (13) is fixed via a cover plate (23).

Figure 4:
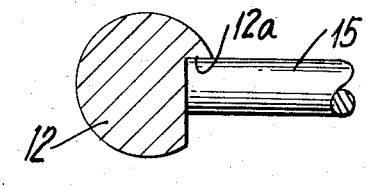
FIG. 4 is a sectional view taken along the line 4—4 of FIG. 3.

A plunger (15) is extending in a direction almost perpendicular to the radial direction of the wheel and with one end engageable with a cutout (12a) provided in the peripheral surface of said revolving shaft (12), as shown in FIG. 4, while the center part is supported by a metal (24) and the other end rests against one side of the diaphragm (13).

Further, except the end of the plunger (15) in engagement with the revolving shaft (12), it is preferrable to have the plunger (15) constructed of a light-weight, low-friction material, such as synthetic plastics. A spring (14) pushes said plunger (15) always to the right. A sleeve (guiding element) 25 is fitted into the canal inside the second housing, where said plunger is to be inserted, and made of low friction material, for instance, polyamide resin, tetrafluoroethylene resin, phenolic resin, polyacetal resin, etc., while the sliding part (15a) of the plunger (15) is supported by the guiding surface of the sleeve (25).

The device operates as follows: When the tire pressure is higher than the prescribed value, the diaphragm (18), due to the inside pressure of tire is pushed to the left and the plunger (15) is engaged with the cutout (12a) in the revolving shaft (12) so that the magnet maintains its position at right angle to the magnetically actuable switch 8 which, consequently, remains inoperative giving no alarm.

When the tire pressure decreases during vehicle's driving, then the force of the spring (14) exceeds the force pushing the diaghragm to the left, moves the plunger (15) to the right and disengages it from the revolving shaft (12) so that the revolving shaft (12) and the magnet (11) are turned by 90° by the force of the spring (10) in which energy has been accumulated thus, effecting, in accordance with the revolution of the wheel, an intermittent concentration of the magnetic flux in the switch element so that alarm is given of decreased tire pressure by a repeated closing of the magnetically actuable switch 8.

It has been ascertained that, when a vehicle is driving at high speed, the sliding part (15a) of the plunger (15), which moves in a direction almost perpendicular to the centrifugal force arising from the revolution of tire, and the spring (14) are pressed onto the inner surface of the sleeve (25). However said sleeve (25) consists of a low friction material so that the movement of the plunger (15) is not hindered and the device is capable, according to a test example, of operating satisfactorily also at a speed of 220 km/h.

Figure 5:
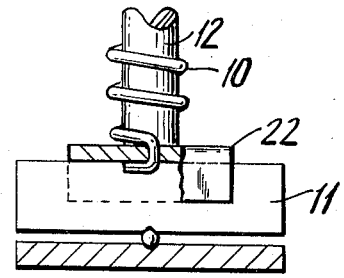
FIG. 5 is a partial elevational view, partly in section, showing the locking of the biasing spring in the lower portion of the shaft member.

Further the lower end of the spring (10), biasing the revolving shaft (12) is bent into a U shape and engaged with the plate (22) as shown in FIG. 5 and it can not be released from said plate (22) under the centrifugal force acting upon the spring (10).

In the example shown in FIG. 3, the sleeve (25) can be pressed into the second housing (18) and then the guiding surface of the sleeve (25) can be machined to the dimension and finished.

Figure 6:
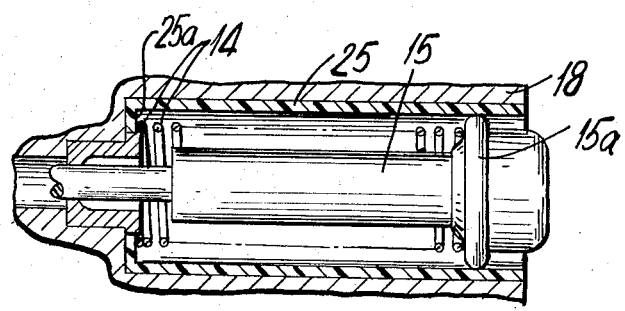
FIG. 6 is a view similar to FIG. 3 showing the right-hand part of the inventive device with a second embodiment of the guide element.

In the second example shown in FIG. 6, a flange (25a) extending to the inside is formed at the inner end of the sleeve (25) forming the latter's integral part which is fixed by the spring (14).

Figure 7:
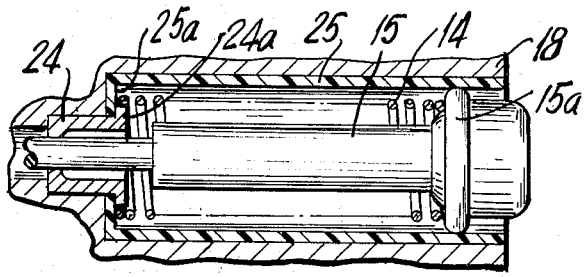
FIG. 7 is a view similar to FIG. 6 showing a third embodiment of the guide element.

In the third example shown in FIG. 7, a flange (25a) is formed in the sleeve (25), forming the latter's integral part, similarly to the example of FIG. 6, and fixed by a flange (24a) formed in the metal of a bushing (24).

Figure 8:
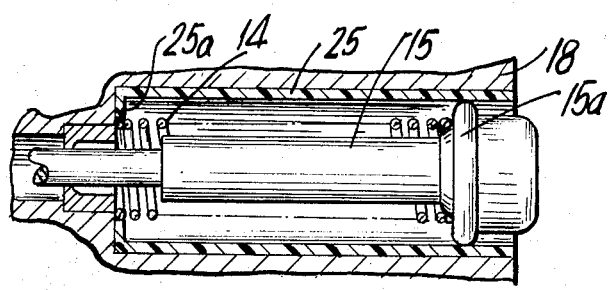
FIG. 8 is a view similar to FIG. 6 showing a fourth embodiment of the guide element.

In the fourth example shown in FIG. 8, a flange (25a) is formed in the sleeve (25) forming the latter's integral part similarly to the example of FIG. 6 and the spring (14) is fixed in its place in regard to the radial direction by means of inner cylindrical surface of the flange.

Further it is possible to prepare the guiding surface for the plunger by forming a film on the inner surface of the housing (18) of a chemical compound such as molybdenum bisulphide or a resin such as tetrafluoroethylene resin etc. instead of said sleeve.

The present invention, as mentioned above, relates to a device for detecting the tire pressure, to be arranged on the wheel of a vehicle, comprising a moving member (15) movable in a direction substantially perpendicular to the radial direction of the wheel and responding to the tire pressure and a housing (18) with an inner surface guiding said moving member (15) characterized by that on the inner surface of said housing (18) a guiding surface (25) made of a low friction material is provided, and according to the present invention it is possible to solve completely the serious defect that due to the centrifugal force produced by the rotation of the wheel. The moving member (15) is pressed onto the housing (18) with excessive force hindering the movement of the member (15) so that the function of the device is lost when the vehicle is driving at a high speed. On the contrary, according to experience, it has become possible to give alarm of decreased tire pressure promptly even when driving at a high speed of 220 km/h. For this purpose, it suffices to provide a guiding surface made of a low friction material and the design is effective, being capable of promoting the function of the device for indicating tire pressure, epoch-making and very cheap.

What is claimed is

1. A tire pressure detecting device mounted on a vehicle wheel assembly including a rotatable wheel with a wheel rim carrying a tire and a stationary element supported on a wheel axle, comprising a revolving part secured to said rim for moving therewith along a circular path and a fixed part secured to said stationary element and disposed adjacent said circular path, said revolving part comprising a first housing portion extending through said wheel rim and a second housing portion extending at an angle thereto at the side of said rim carrying said tire, said first and second housing portions being secured to and communicating with each other, a shaft member rotationally mounted in said first housing portion, and having an inner end portion projecting in the radial direction of said wheel, a magnet mounted on said inner end portion of said shaft member and producing a magnetic field, a spring means rotationally biasing said shaft member into an operative position, a movable member exposed on its one end to tire pressure and extending substantially tangential to said wheel rim and slidably guided in said second housing portion and being movable in response to a pressure drop in said tire, said movable member being engageable with said shaft member to lock said shaft member and said magnetic member in said inoperative position, said movable member being movable upon tire pressure drop to unlock the said shaft member to permit turning said magnetic member into said operative position under the action of said spring means, and a guide element received in said second housing for guiding said movable member and made of a material having a low coefficient of friction to insure an instantaneous response of said movable member to said tire pressure variations even under very high centrifugal forces, said fixed part comprising a switch element responsive to said magnetic field of said magnetic member while in said operative position, to produce a signal for a warning system.

2. A tire pressure detecting device according to claim 1, wherein said guide element comprises a sleeve member received in said second housing and including a helical compression spring for forcing said movable member against said tire pressure.

3. A tire pressure detecting device according to claim 2, wherein said sleeve member is press-fitted in said second housing and having a guide surface which is machined to dimension and finished.

4. A tire pressure detecting device according to claim 2, wherein said sleeve member has an end facing said first housing, with a circular flange projecting radially inwardly, and said helical compression spring applies against said circular flange in the axial direction of said sleeve member.

5. A tire pressure detecting device according to claim 4, including a bearing bushing for said movable member at the inside of said sleeve member facing said first housing, said bushing being formed with a radially outwardly projecting flange for retaining said circular flange of said sleeve member in its position.

6. A tire pressure detecting device according to claim 2, wherein said sleeve member has an end facing said first housing, with a circular flange projecting radially inwardly and having an inner cylindrical surface against which said helical compression spring applies outwardly in the radial direction of said sleeve member.

7. A tire pressure detecting device according to claim 1, wherein said spring means comprises a helical torsion spring having a lower end adjacent said magnetic member, said shaft member carries a plate at its said inner end portion and said lower end of said helical torsion spring is bent into a U-shape and engaged with said plate to lock said spring against the effect of centrifugal forces.

* * * * *